United States Patent
Kirubaharan et al.

(10) Patent No.: US 8,282,167 B2
(45) Date of Patent: Oct. 9, 2012

(54) ADJUSTMENT FITTING FOR A MOTOR VEHICLE COMPONENT, AND METHOD FOR SECURING THE LOCKING EFFECT OF AN ADJUSTMENT FITTING

(75) Inventors: Albert Kirubaharan, Burscheid (DE); Ingo Kienke, Wermelskirchen (DE); Mario Budweg, Huckeswagen (DE); Jurgen Otto, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 387 days.

(21) Appl. No.: 12/299,105

(22) PCT Filed: May 3, 2007

(86) PCT No.: PCT/EP2007/003916
§ 371 (c)(1),
(2), (4) Date: May 14, 2009

(87) PCT Pub. No.: WO2007/124959
PCT Pub. Date: Nov. 8, 2007

(65) Prior Publication Data
US 2009/0309404 A1  Dec. 17, 2009

(30) Foreign Application Priority Data
May 3, 2006 (DE) .................. 10 2006 020 751

(51) Int. Cl.
*B60N 2/02* (2006.01)
(52) U.S. Cl. ................... 297/362; 475/175; 475/177
(58) Field of Classification Search ............. 297/362; 475/175, 177
See application file for complete search history.

(56) References Cited

U.S. PATENT DOCUMENTS

| | | | | |
|---|---|---|---|---|
| 5,871,414 A | * | 2/1999 | Voss et al. | 475/175 |
| 6,305,748 B1 | * | 10/2001 | Ohba | 297/362 |
| 7,090,298 B2 | * | 8/2006 | Lange | 297/362 |

(Continued)

FOREIGN PATENT DOCUMENTS

| DE | 19548809 C1 | 5/1997 |
|---|---|---|
| DE | 10232029 A1 | 2/2004 |

OTHER PUBLICATIONS

International Preliminary Report on Patentability with Written Opinion dated Dec. 24, 2008 for corresponding application PCT/EP2007/003916 (7 pgs.).

(Continued)

*Primary Examiner* — Laurie Cranmer
(74) *Attorney, Agent, or Firm* — Foley & Lardner LLP

(57) ABSTRACT

Disclosed is an adjustment fitting for a motor vehicle component, especially a vehicle seat. Said adjustment fitting comprises a first part and a second part which is rotatable relative to the first part about a rotational shaft by means of a gear unit. The gear unit encompasses a first gear on the first part of the fitting and a second gear on the second part of the fitting, the second gear being disposed eccentric to the first gear. Two wedge segments are provided for securing the eccentric arrangement of the first gear relative to the second gear. The inventive adjustment fitting is characterized in that the wedge segments have an inner radius and an outer radius while the adjustment fitting further comprises a decelerating element which is fitted with an extension that starts at the rotational shaft, runs in an axial direction, and corresponds approximately to the outer radius of the wedge segments.

6 Claims, 4 Drawing Sheets

U.S. PATENT DOCUMENTS

| | | | | |
|---|---|---|---|---|
| 7,461,900 B2 * | 12/2008 | Lange | ........................ | 297/367 R |
| 7,497,519 B2 * | 3/2009 | Dill et al. | ....................... | 297/362 |
| 7,648,203 B2 * | 1/2010 | Voss et al. | ...................... | 297/362 |
| 2005/0110322 A1 * | 5/2005 | Cha | ............................... | 297/362 |

OTHER PUBLICATIONS

German Office Action dated Dec. 20, 2006 for corresponding GB Application No. 102006020751.3 (2 pgs.).

\* cited by examiner

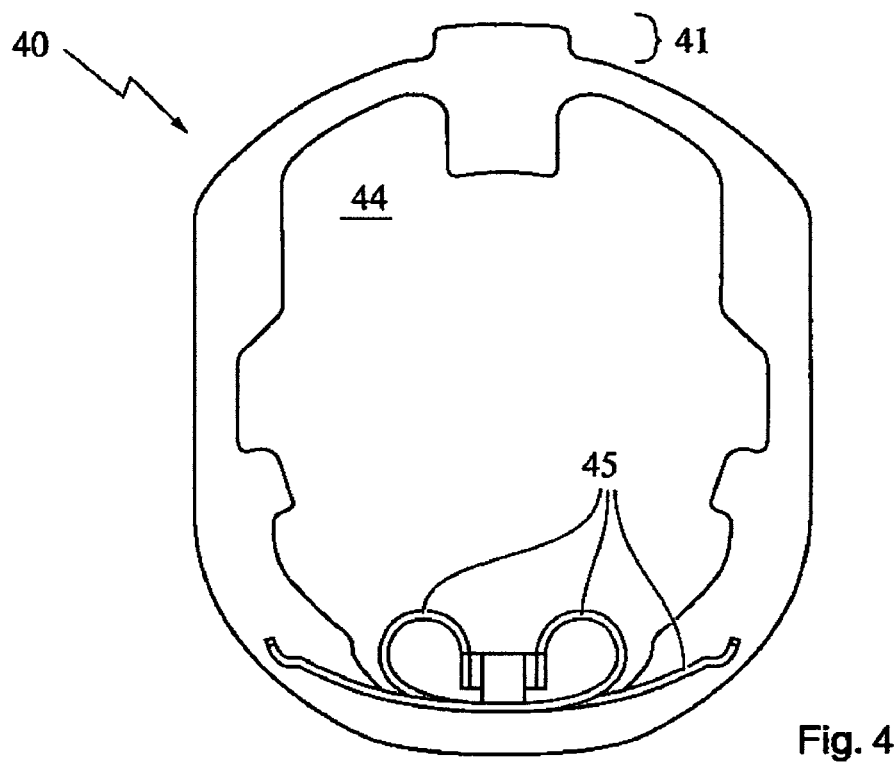
Fig. 4
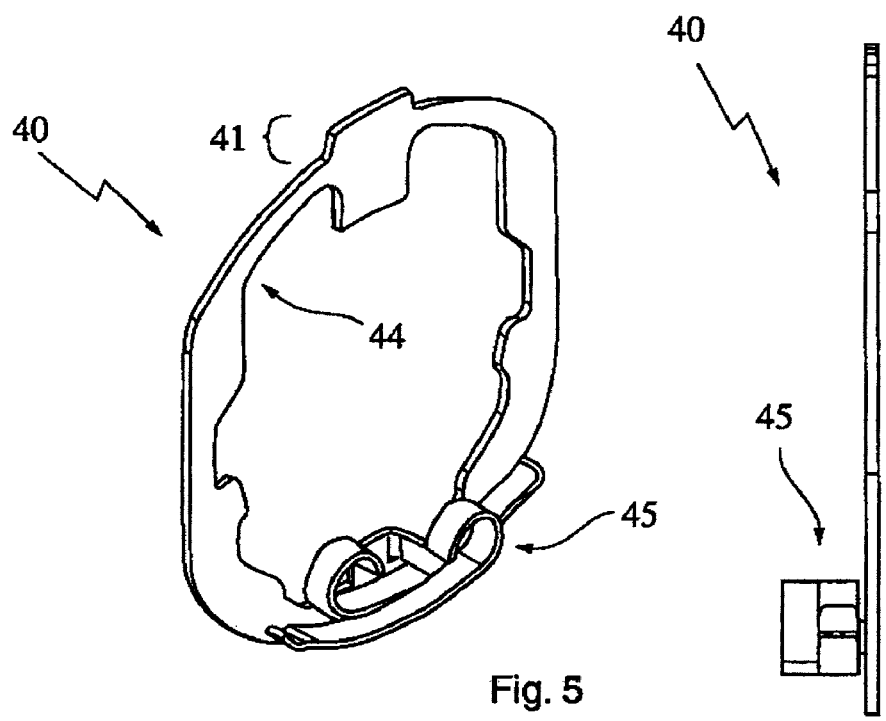
Fig. 5
Fig. 6

ADJUSTMENT FITTING FOR A MOTOR VEHICLE COMPONENT, AND METHOD FOR SECURING THE LOCKING EFFECT OF AN ADJUSTMENT FITTING

The present invention relates to an adjustment fitting for a motor vehicle component, in particular a vehicle seat, comprising a first fitting part and comprising a second fitting part provided to be rotationally adjustable relative thereto about a rotational shaft by means of a gear unit, the gear unit comprising a first gear on the first fitting part and the gear unit comprising a second gear on the second fitting part arranged eccentrically to the first gear, two wedge segments being provided for ensuring the eccentric arrangement of the first gear relative to the second gear.

Such adjustment fittings are generally known. For example, an adjusting and securing device for seats such as motor vehicle seats, for adjusting the backrest relative to the seat part, is known from the German patent application DE 195 48 809 C1. In this case, for preventing the deflection of the fitting part connected to the backrest, under dynamic operating conditions and over a time period characterized by vibrations and impacts, a locking ring is arranged in the radial plane between the wedge segments and the driver, the locking ring having at least one locking lug on an external periphery which may engage in the counter-gear of the fixed fitting part. This is a drawback as, for the force transmission of the locking force and/or the braking force, a plurality of elements have to cooperate with one another, so that for ensuring a high degree of reliability of the locking device, close tolerances of these different components have to be maintained, which makes the production of the securing device more costly and, moreover, increases the cost of producing the adjusting and securing device.

It is, therefore, the object of the present invention to provide an adjustment fitting for a motor vehicle component, in particular a vehicle seat, the adjustment fitting comprising a first fitting part and a second fitting part, the second fitting part being provided to be rotationally adjustable relative to the first fitting part about a rotational shaft by means of a gear unit, firstly the adjustment fitting being relatively smooth-running, simple and thus able to be produced cost-effectively and, secondly, being adjusted against deflection and yet comprising a relatively low number of parts, the tolerance requirements thereof being as low as possible.

This object is achieved by an adjustment fitting, the adjustment fitting comprising a first fitting part and a second fitting part, the second fitting part being provided to be rotationally adjustable relative to the first fitting part about a rotational shaft by means of a gear unit, the gear unit comprising a first gear on the first fitting part and the gear unit comprising a second gear on the second fitting part arranged eccentrically to the first gear, two wedge segments being provided for ensuring the eccentric arrangement of the first gear relative to the second gear. Moreover, according to a first embodiment of the invention it is provided that the wedge segments have an internal radius and an external radius, the adjustment fitting comprising a braking element and the braking element in the radial direction starting from the rotational shaft comprising an extension approximately corresponding to the external radius of the wedge segments. As a result, the braking element may be designed to be particularly structurally compact and small, so that the adjustment fitting as a whole may be produced in a very structurally compact manner and thus cost-effectively.

According to an alternative embodiment of an adjustment fitting comprising a first and second fitting part, as well as a gear unit comprising a first and second gear between the fitting parts and two wedge segments for ensuring the eccentric arrangement of the gears, it is further provided and/or it is preferably provided according to the first embodiment, that the braking element may be adjusted into a locked position and into a position of release, the braking element comprising a first locking element, the first locking element being provided in the locked position to engage radially to the rotational shaft in a second locking element of the first fitting part, the second locking element in the radial direction starting from the rotational shaft having a smaller extension than the second gear and than the first gear. As a result, according to the invention it is advantageously possible that without impairing the function of the gears a locking of the fitting parts relative to one another is possible by means of the braking element in a simple and cost-effective manner.

Preferably, according to the present invention it is provided that the first locking element and the second locking element are provided such that a number of locked positions are predetermined, the number of locked positions being smaller than the number of teeth, both of the first gear and of the second gear. This has the particular advantage that the first locking element and the second locking element may be designed to be comparatively large and able to be subjected to loads, so that even with extreme loads, as for example occur in the event of accidents or the like, a secure locking is ensured by the braking element. In particular, it is preferred if the second locking element is formed from a plurality of projections which are, in particular, round in cross section and which project into the plane of the braking element.

According to the invention, according to a third embodiment of the present invention, in an adjustment fitting comprising a first fitting part and a second fitting part, as well as a gear unit comprising a first and second gear between the fitting parts as well as comprising two wedge segments for ensuring the eccentric arrangement between the first and second gear, it is further provided that the wedge segments respectively comprise a third locking element, the third locking element being provided for engagement in a recess of the braking element, parallel to the rotational shaft. As a result, according to the invention it is possible to produce a direct force transmission and/or a direct force introduction between at least one of the wedge segments and the braking element, which positively influences the stability of the entire arrangement.

According to a fourth embodiment of the present invention, in an adjustment fitting comprising a first and second fitting part, as well as a gear unit comprising a first and second gear as well as two wedge segments for ensuring the eccentric arrangement of the first and second gear, it is further provided that the adjustment fitting is provided for a motor vehicle seat comprising a seat part and comprising a backrest part, the first fitting part being provided fixed to the backrest part, the second fitting part being provided fixed to the seat part and the braking element providing direct force action between the first fitting part and at least one of the wedge segments. As a result, according to the invention it is possible in a particularly advantageous manner that the operational reliability of the adjustment fitting according to the invention is positively influenced by the direct force transmission.

According to a fifth embodiment of the present invention, in an adjustment fitting comprising a first and a second fitting part, as well as a gear unit between both fitting parts comprising a first and a second gear as well as two wedge segments for ensuring the eccentric arrangement of the first gear relative to the second gear, it is further provided according to the invention that the braking element comprises a first locking element and a spring element, the spring element being provided to displace the braking element toward the first locking element, the locking element and the spring element being substantially arranged at opposing ends of the braking element. As a result, the locking effect may be further improved in a simple manner as, relative to the first locking element, a greater constructional space is available so that the spring element according to the invention may be provided in a particularly robust manner.

A further subject of the present invention is a method for securing the locking effect of an adjustment fitting for a motor vehicle component, in particular a vehicle seat, the adjustment fitting comprising a first fitting part and a second fitting part provided to be rotationally adjustable relative thereto about a rotational shaft by means of a gear unit, the gear unit comprising a first gear on the first fitting part and the gear unit comprising a second gear on the second fitting part arranged eccentrically to the first gear, two wedge segments being provided for ensuring the eccentric arrangement of the first gear relative to the second gear and a braking element being provided, whereby direct force action is provided between the first fitting part and at least one of the wedge segments. As a result, a particularly secure braking and/or locking effect of the braking element may be reliably ensured over the entire life of the adjusting device and/or of the adjustment fitting.

Embodiments of the invention are described in more detail in the following description and shown in the drawings, in which:

FIGS. 4 to 6 show different views of a braking element.

Figure 1:
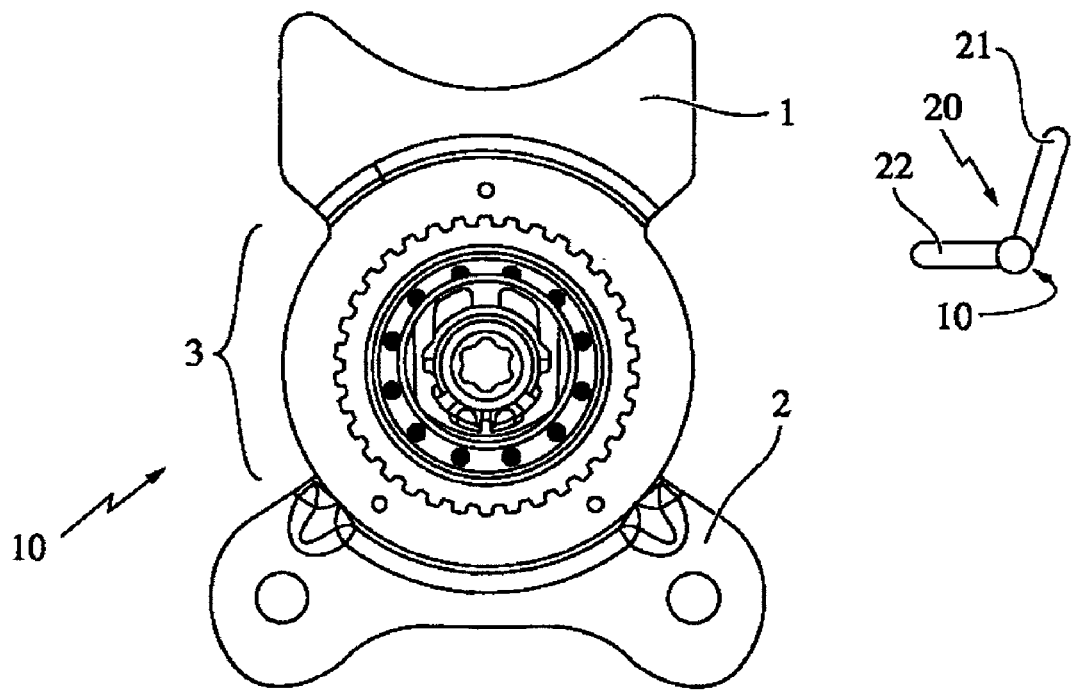
FIGS. 1 and 2 show a front and rear view of an adjustment fitting according to the invention in assembled form.
Figure 2:
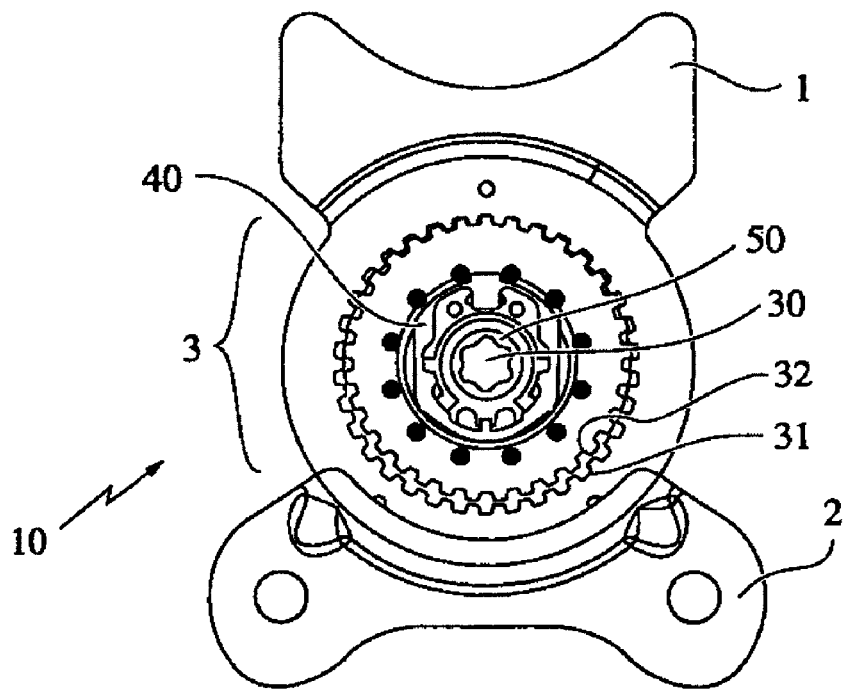

In FIGS. 1 and 2 an adjustment fitting 10 according to the invention is shown in front and rear view. The adjustment fitting 10 connects a first fitting part 1 to a second fitting part 2. The fitting parts are provided to be rotationally adjustable relative to one another about a rotational shaft 30 by rotating a drive element 50 (see FIG. 2), in particular with a large gear ratio of, for example, 1:20 to 1:50, preferably 1:30 to 1:40. As a result, it is possible according to the invention that the adjustment fitting 10 may be used for connecting different parts of a motor vehicle component which are provided to be rotationally movable relative to one another, may be steplessly adjusted and is self-locking. Such a motor vehicle component 20 is shown schematically in the right-hand part of FIG. 1 in the example of a motor vehicle seat 20. Such a seat 20 and/or such a motor vehicle component 20, for example, have a backrest part 21 and a seat part 22, which are provided connected to one another in a rotationally adjustable manner via an adjustment fitting 10 according to the invention.

According to the invention, the rotational adjustability is ensured inside the adjustment fitting 10 by a gear unit 3, the gear unit 3 comprising a first gear 31 on the first fitting part 1 and a second gear 32 on the second fitting part 2. According to the invention, the gear unit 3 is configured to be self-locking by means of a frictional connection and is particularly preferably configured as a so-called wobble mechanism. However, with repeated impulses occurring over a lengthy period of time between the fitting parts 1, 2 (and/or when torques occur) it may arise that the first fitting part 1 is deflected relative to the second fitting part 2, i.e. namely that a small but continuous displacement of the fitting parts 1, 2 relative to one another occurs in the same direction over a lengthy period of time. This is particularly critical when the adjustment fitting is a fitting on a motor vehicle seat, and moments and/or forces are applied against the backrest 21 in substantially the same direction, so that in the long run a displacement of the adjustment fitting occurs if no suitable counter measures are taken. In order to prevent such a displacement, the braking element 40 is provided according to the invention.

Figure 3:
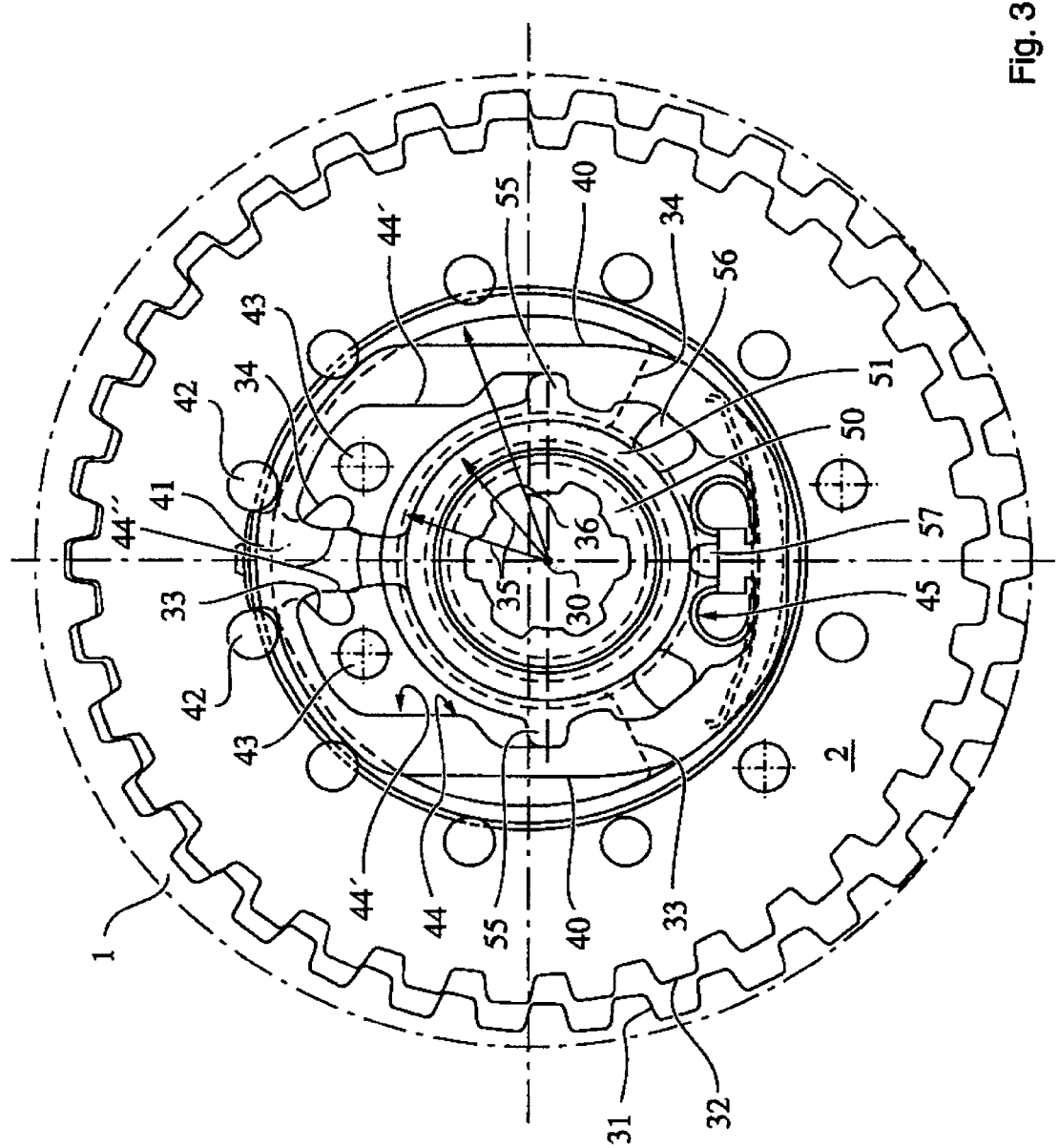
FIG. 3 shows a detailed view of a plan view of the assembled adjustment fitting.

In FIG. 3 a detailed view of the adjustment fitting 10 and/or of the gear unit 3 is shown. As a result, it may be seen that the rotational shaft 30 represents the center point and/or the center axis of the drive element 50. The second gear 32 and thus the second fitting part 2 are arranged eccentrically to the center axis 30. This eccentricity is achieved by an eccentric portion being arranged between the drive element 50 and the second fitting part 2 and/or the second gear 32, which comprises a first wedge element 33 and/or a first wedge segment 33 and a second wedge element 34 and/or a second wedge segment 34. The wedge segments 33, 34 are forced apart by a further spring, not shown in FIG. 3, on their broad opposing sides arranged in FIG. 3 in the upper region of the figure, such that the eccentricity of the second gear 32 relative to the rotational shaft 30 is at a maximum. This has the result that, at one point of the periphery of the second gear 32, said second gear meshes with the first gear 31. This is the case in the situation shown in FIG. 3 in the upper region of the second gear 32 and/or the first gear 31. The wedge segments 33, 34 have an internal radius 35 as well as an external radius 36 starting from the rotational shaft 30. As a result of the wedge shape of the wedge segments 33, 34 the internal radius 35 differs from the external radius 36, the external radius 36 being larger than the internal radius 35. The external radius 36 thus corresponds substantially to the radial extension of the braking element 40 starting from the rotational shaft 30. Within the scope of the present invention it is intended to be understood thereby that the braking element 40, with regard to its extension in the radial direction starting from the rotational shaft 30, corresponds to the external radius 36 of the wedge segments 33, 34, in the range of a maximum of 90 to 120% thereof, it being preferred according to the invention if the extension of the braking element 40 in the radial direction starting from the rotational shaft 30 corresponds to a maximum of approximately 95% to 110% of the external radius 36. According to the invention, moreover, the braking element 40 is pressed upwards by a spring element 45 (in the setting according to FIG. 3). In this connection, a first locking element 41 engages radially in a recess between two second locking elements 42. As a result, the braking element 40 is locked against rotation about the rotational shaft 30. From FIG. 3, moreover, it is clear that the wedge segments 33, 34 comprise a third locking element 43, which in the axial direction, i.e. parallel to the rotational shaft 30, projects into the plane of the braking element 40 and is usually arranged in a recess 44 of the braking element 40. This recess 44 of the braking element 40 has for the third locking element 43 of the respective wedge segment 33, 34 a first edge 44' and a second edge 44" (and/or a first stop 44' and a second stop 44"). If a force is exerted on the adjustment fitting 10, it may result that such a force and/or such a torque causes a displacement of one of the wedge segments 33, 34 such that the third locking element 43 strikes and/or is pressed against the braking element 40 (via one of the edges and/or stops 44' and/or 44"), as a result of which (in the event of the second wedge segment 34 striking against the second edge 44" of the recess 44 of the braking element 40) a force component oriented to the left, for example, is exerted on the braking element 40. This force is compensated (in the sense of a reaction force) by the braking element 40 and/or by the first fitting part 1 by means of the second locking element 42 such that an opposingly oriented force (in the example oriented to the right) acts at the contact point of the first locking element 41 with the second locking element 42. A further force component, which may be regarded as compensation for the force exerted by the third locking element 43 on the braking element 40, acts (in the example oriented to the right) on the drive element 50, in particular in a region denoted by the reference numeral 55. As a result, force flows through at least three points of application which guarantees an effective locking and/or an effective securing of the first fitting part 1 relative to the second fitting part 2. A region of the drive element 50 provided with the reference numeral 57 is provided as an end stop for the movement of the braking element 40 forced upwards by the spring element 45.

In FIGS. 4 to 6 different views of the braking element 40 are shown. In this connection, FIG. 4 shows a schematic plan view and/or front view of the braking element 40. The recess 44 of the braking element 40, the first locking element 41 as well as the spring element 45 are visible. These elements are also shown in a perspective view of the braking element 40 shown in FIG. 5. FIG. 6 shows a sectional view of the braking element 40, in which in particular the spring element 45 is visible. From FIG. 6 it is revealed that the braking element 40 extends substantially entirely in one plane (except for the spring element 45), which in the adjustment fitting 10 according to the invention extends in the radial direction, i.e. perpendicular to the rotational shaft 30. According to the invention it is provided that starting from the radial plane of the braking element 40, the first and second gear 31, 32, for example, are arranged to the left of the plane of the braking element 40. In this example, the second locking element 42 which is connected to the first fitting part 1 and/or which is part of the first fitting part 1, would project from the opposing side, i.e. from the right, into the plane of the braking element 40, so that the first locking element 41 is able to engage with the second locking element 42 in the locked position of the braking element 40, as is shown in FIG. 3. The third locking element 43 also projects into the plane of the braking element 40 and namely in the example shown again from the left-hand side, i.e. from the same side on which the first and second gear 31, 32 are located relative to the braking element 40. According to the invention it is further provided that the wedge segments 33, 34 are forced apart by means of a further spring element 46 on their broad sides, so that the eccentricity of the first gear 31 is maximized relative to the second gear 32 (see FIG. 7).

Figure 7:
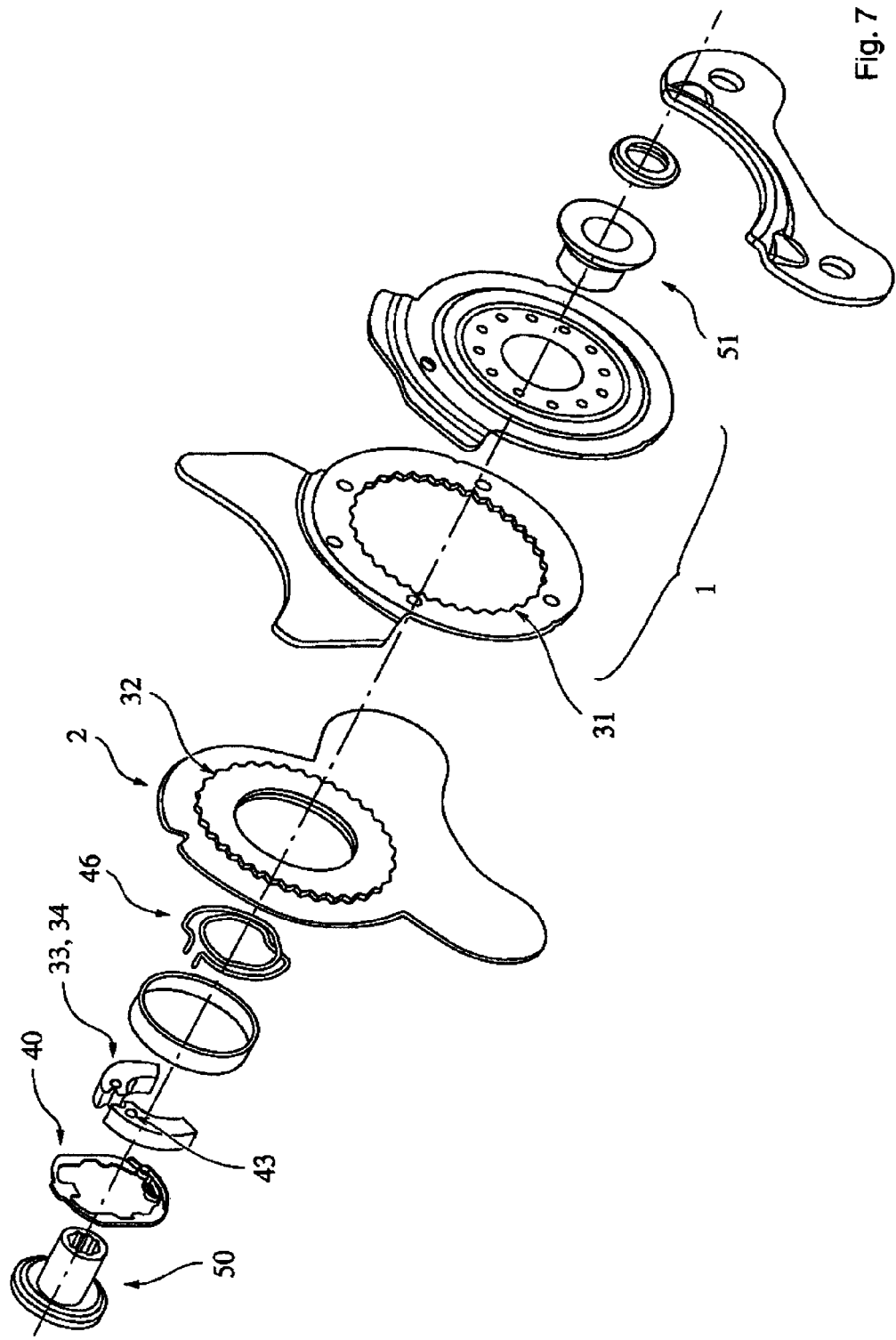
FIG. 7 shows an exploded view of the essential parts of the adjustment fitting according to the invention.

An exploded view of the essential parts of the adjustment fitting 10 is revealed from FIG. 7. A drive element 50 has a spline-shaped recess in its center. The rotational shaft 30 (not shown in FIG. 7) extends through the drive element 50. The drive element 50 has a driver 56 to which also the region of the drive element 50 denoted in FIG. 3 by the reference numeral 55 belongs. By means of the driver (for the sake of simplicity not denoted in FIG. 7) the wedge segments 33, 34 are driven by a rotation of the drive element 50 about the rotational shaft 30 in either rotational direction. In this connection, the eccentric adjustment of the first gear 31 relative to the second gear 32 is altered. At the same time, the braking element 40 is also rotated via the positive connection of the drive element 50 to its driver regions 55, 56. To this end, starting from the locked position shown in FIG. 3, the braking element 40 has to be adjusted into a position of release, in which the braking element is displaced downwards in the direction in FIG. 3 against the spring force of the spring element 45, so that the braking element 40 with the first locking element 41 no longer engages between the projections of the second locking element 42, i.e. the braking element 40 is radially adjusted with its first locking element 41 inside the internal radius of the second locking element 42 and may thus be rotated together with the drive element 50. Such a rotation causes a wobble motion of the first fitting part 1 and thus of the first gear 31 about the second fitting part 2 and/or the second gear 32. The first gear 31 has in this case at least one tooth more than the second gear 32, so that it results in a rotational adjustment of the first fitting part 1 relative to the second fitting part 2. If the rotational movement about the rotational axis 30 of the drive element 50 is terminated, either the brake element 40 is adjusted such that the first locking element 41 on its external face strikes the inner face of one of the projections of the second locking element 42, the force action of the spring element 45 exerting a pressure force and/or contact force of the outer face of the first locking element 41 on the second locking element 42. A locking effect of the adjustment fitting 10 is achieved by forcing apart the wedge segments 33, 34 by means of the further spring element 46. However, should this locking effect not be sufficient, in particular with variable loads and/or vibrations or shaking movements, the adjustment fitting 10 is slightly displaced such that the first locking element 41 engages between two projections of the second locking element 42 by rotating the braking element 40 and thus locking is achieved between the first and second fitting part 1, 2. An additional deflection of the adjustment fitting 10 is thus no longer possible. According to the invention, this slight deflection of the adjustment fitting 10 is not noticeable for a user of the motor vehicle component 20 due to the large gear ratio.

LIST OF REFERENCE NUMERALS

1 First fitting part
2 Second fitting part
3 Gear unit
10 Adjustment fitting
20 Motor vehicle component
21 Backrest part
22 Seat part
30 Rotational shaft
31 First gear
32 Second gear
33 First wedge segment
34 Second wedge segment
35 Internal radius of the wedge segments
36 External radius of the wedge segments
40 Braking element
41 First locking element
42 Second locking element
43 Third locking element
44 Recess of the braking element
44', 44" First and second stop
45 Spring element
46 Further spring element
50 Drive element
51 Further drive element
55 Region of the driver
56 Driver of the drive element
57 Region of the drive element

The invention claimed is:
1. An adjustment fitting for a vehicle seat, comprising:
a rotational shaft;
a first fitting part;
a second fitting part;

a gear unit configured to make the second fitting part rotationally adjustable about the rotational shaft relative the to first fitting part, the gear unit comprising:
  a first gear on the first fitting part,
   a second gear on the second fitting part arranged eccentrically to the first gear, and two wedge segments being provided for ensuring the eccentric arrangement of the first gear relative to the second gear, wherein the wedge segments have an internal radius and an external radius; and
  a braking element configured to be adjusted into a locked position and into a position of release, wherein the braking element in the radial direction starting from the rotational shaft comprises an extension approximately corresponding to the external radius of the wedge segments;
  wherein the braking element further comprises a first locking element, the first locking element being provided in the locked position to engage radially to the rotational shaft in a second locking element of the first fitting part, the second locking element in the radial direction starting from the rotational shaft having a smaller extension than the second gear and than the first gear.

2. The adjustment fitting as claimed in claim 1, wherein the first locking element and the second locking element are provided such that a number of locked positions are predetermined, the number of locked positions being smaller than the number of teeth, both of the first gear and of the second gear.

3. The adjustment fitting as claimed in claim 1, wherein the wedge elements respectively comprise a third locking element, the third locking element being provided for engagement in a recess of the braking element, provided parallel to the rotational shaft.

4. The adjustment fitting as claimed in claim 1, wherein the adjustment fitting is provided for a motor vehicle seat comprising a seat part and comprising a backrest part, the first fitting part being provided fixed to the backrest part, the second fitting part being provided fixed to the seat part and the braking element providing direct force action between the first fitting part and at least one of the wedge segments.

5. The adjustment fitting as claimed in claim 1, wherein the braking element further comprises a spring element, the spring element being provided to displace the first locking element of the braking element toward the second locking element, the first locking element and the spring element being substantially arranged at opposing ends of the braking element.

6. A method for securing the locking effect of an adjustment fitting for a vehicle seat, the adjustment fitting comprising a first fitting part and a second fitting part provided to be rotationally adjustable relative thereto about a rotational shaft by means of a gear unit, the gear unit comprising a first gear on the first fitting part and the gear unit comprising a second gear on the second fitting part arranged eccentrically to the first gear, two wedge segments being provided for ensuring the eccentric arrangement of the first gear relative to the second gear and a braking element being provided, wherein by means of the braking element direct force action is provided between the first fitting part and at least one of the wedge segments; wherein the braking element includes a first locking element, two second locking elements, and a recess disposed between the two second locking elements; wherein the first locking element is configured to engage in a radial direction the recess so that the locking effect is secured; wherein each wedge segment includes a third locking element configured to engage an edge of an internal recess of the braking element to act as a stop for the wedge segment after a predetermined displacement.

* * * * *